(12) United States Patent
Cheng

(10) Patent No.: US 8,909,181 B2
(45) Date of Patent: Dec. 9, 2014

(54) METHOD AND APPARATUS FOR IMPLEMENTING FAST FREQUENCY SWEEPING OF MOBILE TERMINAL, AND MOBILE TERMINAL

(75) Inventor: Jian Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 248 days.

(21) Appl. No.: 13/577,780

(22) PCT Filed: May 17, 2011

(86) PCT No.: PCT/CN2011/074178
§ 371 (c)(1),
(2), (4) Date: Aug. 8, 2012

(87) PCT Pub. No.: WO2011/144017
PCT Pub. Date: Nov. 24, 2011

(65) Prior Publication Data
US 2012/0302176 A1 Nov. 29, 2012

(30) Foreign Application Priority Data

May 19, 2010 (CN) .......................... 2010 1 0183912

(51) Int. Cl.
*H04B 15/00* (2006.01)
*H04W 72/08* (2009.01)
(52) U.S. Cl.
CPC .................................. *H04W 72/085* (2013.01)
USPC ..................................... 455/161.3; 455/67.13
(58) Field of Classification Search
USPC .............. 455/41.2, 63.1, 67.11, 67.13, 161.1, 455/161.2, 161.3
See application file for complete search history.

(56) References Cited

U.S. PATENT DOCUMENTS 7,020,178 B2  3/2006  Mason
8,467,784 B2 *  6/2013  Balasubramanian et al.  455/434
(Continued)

FOREIGN PATENT DOCUMENTS

CN  1848998 A  10/2006
CN  1988427 A  6/2007
(Continued)

OTHER PUBLICATIONS

"International Application Serial No. PCT/CN2011/074178, International Preliminary Report on Patentability dated Nov. 20, 2012", (w/ English Translation), 8 pgs.
(Continued)

*Primary Examiner* — Blane J Jackson
(74) *Attorney, Agent, or Firm* — Oppedahl Patent Law Firm LLC

(57) ABSTRACT

The disclosure provides a method for implementing fast frequency sweeping of a mobile terminal, which includes: performing Received Signal Strength Indication (RSSI) measurements in communication frequency bands of a mobile terminal according to a preset first frequency sweeping step length, to obtain multiple first RSSI values (S10); making decisions on the first RSSI values to obtain second RSSI values (S11); sorting the second RSSI values; and performing frequency sweeping according to a sorted result (S12). The disclosure further provides an apparatus for implementing fast frequency sweeping of a mobile terminal, which includes: a first RSSI measuring unit, a RSSI deciding unit, a RSSI sorting unit and a frequency sweeping unit. The method and the apparatus for implementing fast frequency sweeping of the mobile terminal according to the disclosure perform the RSSI measurements according to the preset first frequency sweeping step length, and then sort the measured RSSI values. The sorting method changes a traditional manner of sorting the measured RSSI values in an order of the measured RSSI values from largest to smallest according to frequency points, such that an accurate cell-sweeping frequency point can be searched as soon as possible.

12 Claims, 7 Drawing Sheets

(56) References Cited

U.S. PATENT DOCUMENTS

| | | |
|---|---|---|
| 2004/0001532 A1 | 1/2004 | Mason et al. |
| 2007/0211669 A1* | 9/2007 | Umatt et al. ............... 370/335 |
| 2009/0022208 A1* | 1/2009 | Hall et al. ................... 375/132 |
| 2009/0130977 A1* | 5/2009 | Grushkevich et al. ...... 455/41.2 |
| 2010/0322287 A1* | 12/2010 | Truong et al. ............... 375/133 |

FOREIGN PATENT DOCUMENTS

| | | |
|---|---|---|
| CN | 101013901 A | 8/2007 |
| CN | 101123813 A | 2/2008 |
| CN | 101657003 A | 2/2010 |

OTHER PUBLICATIONS

"International Application Serial No. PCT/CN2011/074178, International Search Report mailed Aug. 18, 2011", 4 pgs.

"International Application Serial No. PCT/CN2011/074178, Written Opinion mailed Aug. 18, 2011", (w/ English Translation), 6 pgs.

* cited by examiner

METHOD AND APPARATUS FOR IMPLEMENTING FAST FREQUENCY SWEEPING OF MOBILE TERMINAL, AND MOBILE TERMINAL

RELATED APPLICATIONS

This application is a nationalization under 35 U.S.C. §371 from International Application Serial No. PCT/CN2011/074178, filed May 17, 2011 and published as WO 2011/0144017 A1 on Nov. 24, 2011, which claims benefit of priority under 35 U.S.C. Section 119 to Chinese Application No. 201010183912.9, filed May 19, 2010; which applications and publication are incorporated herein by reference in their entirety.

TECHNICAL FIELD

The disclosure relates to the technical field of mobile communications, and in particular to a method and an apparatus for implementing fast frequency sweeping of a mobile terminal and a mobile terminal.

BACKGROUND

As a standard for 3G mobile communication appears, a corresponding channel bandwidth is also increased to meet a requirement of communication. For example, in the 3G mobile communication, the channel bandwidth of a Wideband Code Division Multiple Access (W-CDMA) is 5 MHz, and the channel bandwidth of a Time Division-Synchronous Code Division Multiple Access (TD-SCDMA) is 1.6 MHz; however, for a standard for close to 4G mobile communication, for example, in a Long Term Evolution (LTE) system, the channel bandwidth is further increased to 20 MHz.

The increase of the channel bandwidth increases a frequency sweeping time inevitably. A traditional frequency sweeping process is to sweep each of all frequency points in a whole frequency band according to a frequency sweeping step length. The called frequency sweeping refers to that: Received Signal Strength Indication (RSSI) measurements are performed on each frequency point according to a frequency sweeping step length, and then RSSI values measured at all frequency points are sorted in an order of the RSSI values measured from largest to smallest and sent to a cell searching module to perform a cell search, so as to finish network registration and residence.

A frequency band may be swept through the above frequency sweeping process quite accurately and completely; however, as the frequency sweeping means that the RSSI measurement is performed on each frequency point of the whole frequency band and then the cell searching module performs the cell search on each frequency point according to the RSSI values in an order of the RSSI values from largest to smallest, larger consumption of time is caused. Even, a cell with a frequency point corresponding to a non-largest RSSI value is further searched in the frequency sweeping process, such that the cell fails to be searched successfully due to overtime.

SUMMARY

In view of the above problem, one purpose of the disclosure is to provide a method for implementing fast frequency sweeping of a mobile terminal, to solve the problem that a frequency sweeping time is overlong.

A method for implementing fast frequency sweeping of a mobile terminal in the disclosure includes:
performing Received Signal Strength Indication (RSSI) measurements in communication frequency bands of a mobile terminal according to a preset first frequency sweeping step length, to obtain multiple first RSSI values;
making decisions on the first RSSI values to obtain second RSSI values;
sorting the second RSSI values; and
performing frequency sweeping according to a sorted result.

Preferably, the making decisions on the first RSSI values to obtain the second RSSI values may include:
multiplying a maximum value of the first RSSI values with a constant value, to obtain a decision threshold;
comparing each of the first RSSI values with the decision threshold;
reserving the first RSSI values larger than the decision threshold as the respective second RSSI values; and
zeroing the first RSSI values smaller than or equal to the decision threshold forcibly.

Preferably, the method may further include: after making decisions on the first RSSI values to obtain the second RSSI values and before sorting the second RSSI values and performing the frequency sweeping according to the sorted result,
judging whether there is a cell-sweeping frequency point between two adjacent frequency points corresponding to two adjacent second RSSI values respectively.

Preferably, when there is a cell-sweeping frequency point between the two adjacent frequency points corresponding to the two adjacent second RSSI values respectively, a RSSI measurement is performed on the frequency points corresponding to the second RSSI values according to a preset second frequency sweeping step length to obtain third RSSI values, and the third RSSI values are updated to the second RSSI values.

Preferably, the sorting the second RSSI values and performing the frequency sweeping according to the sorted result may include:
searching a second RSSI value corresponding to a preset center frequency point, placing the frequency points corresponding to the second RSSI values in an order of the second RSSI values from largest to smallest into elements in a cell-sweeping frequency point list, and marking the respective elements;
performing a leftward and rightward extended searching with reference to frequency points corresponding to the marked elements, and placing the searched frequency points corresponding to the second RSSI values into the elements in the cell-sweeping frequency point list respectively; and
sweeping the frequency points corresponding to the second RSSI values according to the cell-sweeping frequency point list.

The disclosure further provides a fast frequency sweeping apparatus for a mobile terminal, which includes:
a first RSSI measuring unit, configured to perform RSSI measurements in communication frequency bands of a mobile terminal according to a preset first frequency sweeping step length, to obtain multiple first RSSI values;
a RSSI deciding unit, configured to make decisions on the first RSSI values to obtain second RSSI values;
a RSSI sorting unit, configured to sort the second RSSI values; and
a frequency sweeping unit, configured to perform frequency sweeping according to a sorted result.

Preferably, the RSSI decision unit may include:

a threshold operating unit, configured to multiply a maximum value of the first RSSI values with a constant value, to obtain a decision threshold;

a RSSI value comparing unit, configured to compare each of the first RSSI values with the decision threshold; and a RSSI value processing unit, configured to reserve the first RSSI values larger than the decision threshold as the respective second RSSI values; and zeroing the first RSSI values smaller than or equal to the decision threshold forcibly.

Preferably, the apparatus may further include:

a cell-sweeping frequency point judging unit, configured to judge whether there is a cell-sweeping frequency point between two adjacent frequency points corresponding to two adjacent second RSSI values respectively; and a second RSSI measuring unit, configured to perform RSSI measurements on the frequency points corresponding to the second RSSI values according to a preset second frequency sweeping step length to obtain third RSSI values, and to update the third RSSI values to the second RSSI values, when there is a cell-sweeping frequency point between the two adjacent frequency points corresponding to the two adjacent second RSSI values respectively.

Preferably, the RSSI sorting unit may include;

a center frequency point searching unit, configured to search a second RSSI value corresponding to a preset center frequency point, to place the frequency points corresponding to the second RSSI values in an order of the second RSSI values from largest to smallest into elements in a cell-sweeping frequency point list, and to mark the respective elements; and a frequency point extended searching unit, configured to perform a leftward and rightward extended searching with reference to frequency points corresponding to the marked elements, and to place the searched frequency points corresponding to the second RSSI values into the elements in the cell-sweeping frequency point list.

Preferably, the frequency sweeping unit may further be configured to sweep the frequency points corresponding to the second RSSI values according to the cell-sweeping frequency point list.

The disclosure further provides a mobile terminal including the apparatus for implementing the fast frequency sweeping of the mobile terminal above.

The method and the apparatus for implementing the fast frequency sweeping of the mobile terminal and the mobile terminal provided in the embodiment perform the RSSI measurements according to the preset first frequency sweeping step length, and then sort the measured RSSI values, wherein the sorting method changes a traditional manner of sorting the measured RSSI values in an order of the measured RSSI values from largest to smallest in terms of the frequency points, such that an accurate cell-sweeping frequency point can be searched as soon as possible.

DETAILED DESCRIPTION

It should be understood that, specific embodiments described herein are just used for explaining the disclosure, instead of limiting the disclosure.

Figure 1:
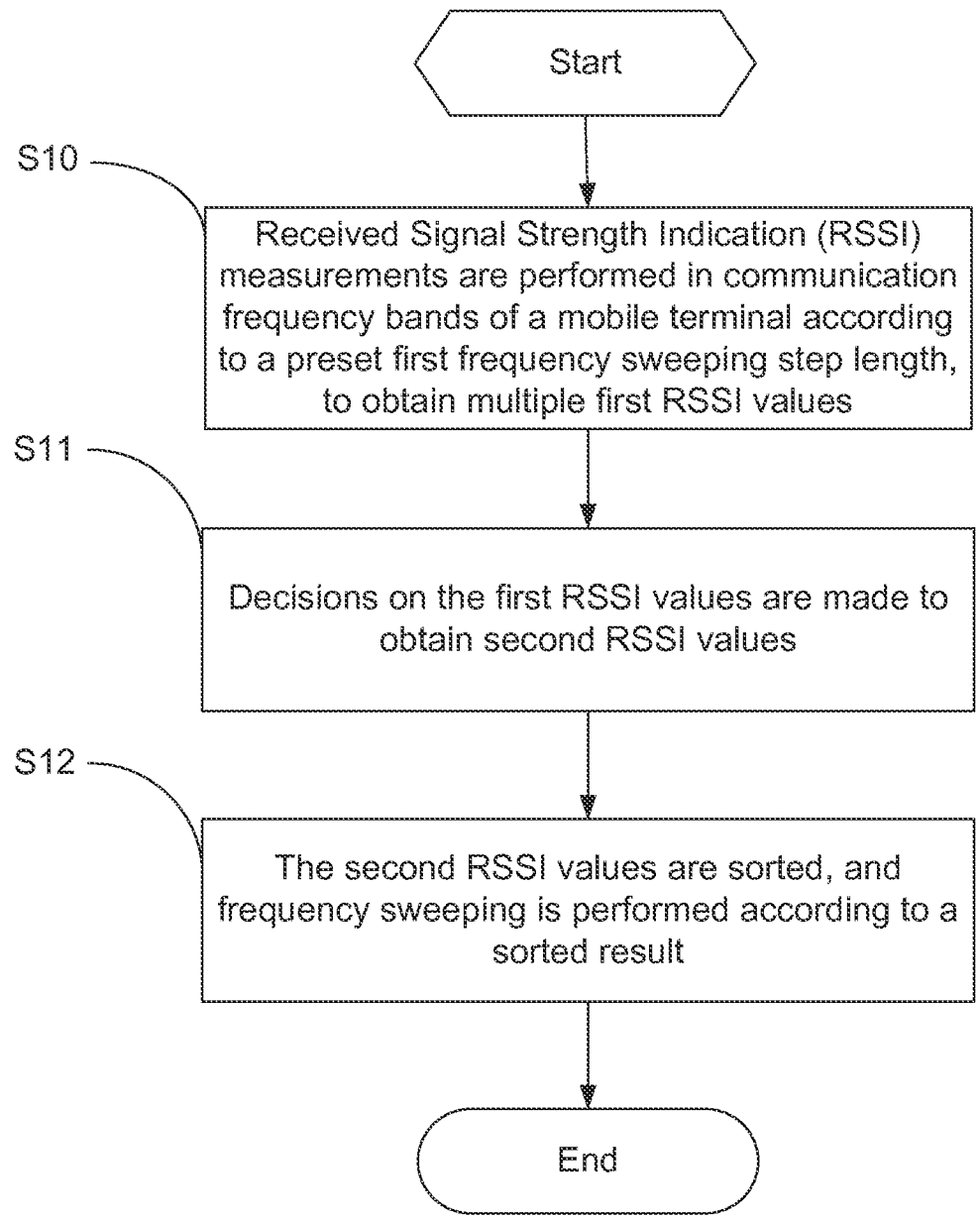
FIG. 1 shows a flow diagram of one embodiment of a method for implementing fast frequency sweeping of a mobile terminal according to the disclosure.

FIG. 1 shows a flow of one embodiment of a method for implementing fast frequency sweeping of a mobile terminal according to the disclosure. The method for implementing the fast frequency sweeping of the mobile terminal according to the embodiment includes the following steps.

S10: Received Signal Strength Indication (RSSI) measurements are performed in communication frequency bands of a mobile terminal according to a preset first frequency sweeping step length, to obtain multiple first RSSI values.

In S10, the preset first frequency sweeping step length is set according to the communication frequency band of the mobile terminal. For example, TD-SCDMA is taken as example, as the channel bandwidth of the TD-SCDMA is 1.6 MHz, the preset first frequency sweeping step length may be set as ¼, ½ or the like of the channel bandwidth. The preset first frequency sweeping step length in the embodiment is preferably ½ of the channel bandwidth, i.e., 800 kHz.

Figure 3:
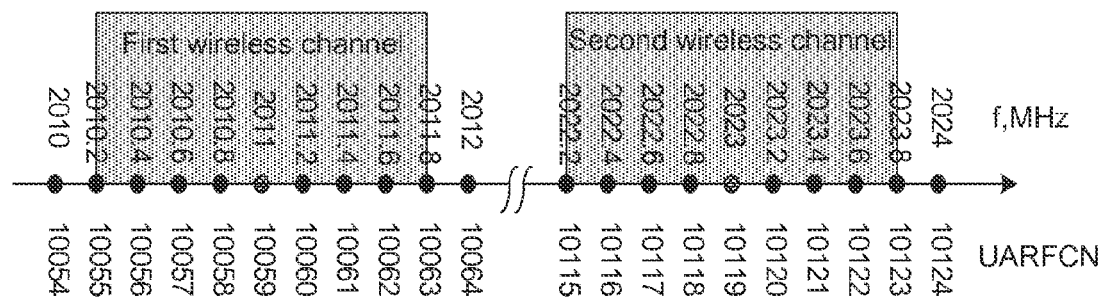
FIG. 3 shows a structure diagram of frequency points of TD-SCDMA in the above embodiment.
Figure 4:
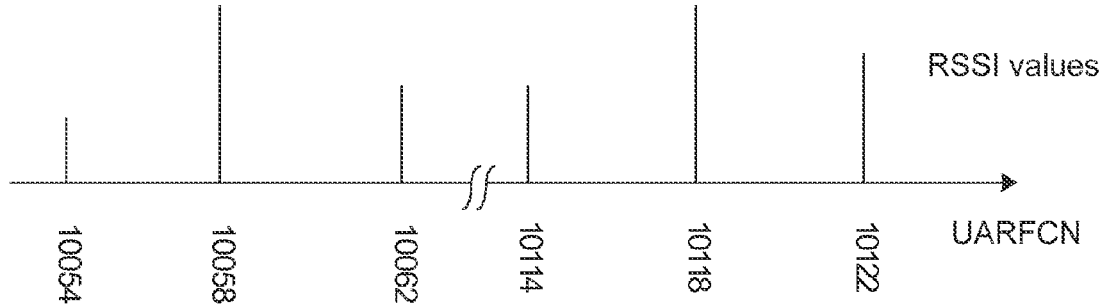
FIG. 4 shows the structure diagram of the frequency points shown in FIG. 3 after performing RSSI measurements according to a preset first frequency sweeping step length.

According to the 3GPP standard, a frequency band resource forms a UTRA Absolute Radio Frequency Channel Number (UARFCN) according to the frequency sweeping step length. One wireless channel is one channel bandwidth formed from a leftward expansion and a rightward expansion by taking one UARFCN as the center, i.e., one radio carrier. As shown in FIG. 3, in the TD-SCDMA, one channel bandwidth occupies eight UARFCNs. A communication frequency band to be swept is the B wave band (2010 MHz to 2025 MHz) of the TD-SCDMA. FIG. 3 shows two wireless channels, wherein the center frequency of the first wireless channel is 2011 MHz and the center frequency of the second wireless channel is 2023 MHz. After the whole B wave band of the TD-SCDMA is divided according to the preset first frequency sweeping step length (800 kHz), the following frequency points are obtained: 2010.0 MHz, 2010.8 MHz, 2011.6 MHz, . . . , 2023.6 MHz, and 2024.4 MHz. After the whole frequency band of the B wave band is swept according to the preset first frequency sweeping step length (800 kHz), two to three obvious RSSI values appear in the wireless channel, and as shown in FIG. 4, three obvious RSSI values appear in the first wireless channel whose the center frequency is 2011 MHz.

Similarly, the above RSSI measurement method is further applicable to other communication frequency band. For example, as a channel bandwidth of WCDMA is 5 MHz, a preset first frequency sweeping step length is set as 1/8, 1/4, 2/1 or the like of the channel bandwidth according to an actual need. Besides, when other communication frequency band (CDMA2000, WiMAX and LTE) is swept, the preset first frequency sweeping step length may further be set according to the above method.

S11: decisions on the first RSSI values are made to obtain second RSSI values.

Figure 2:
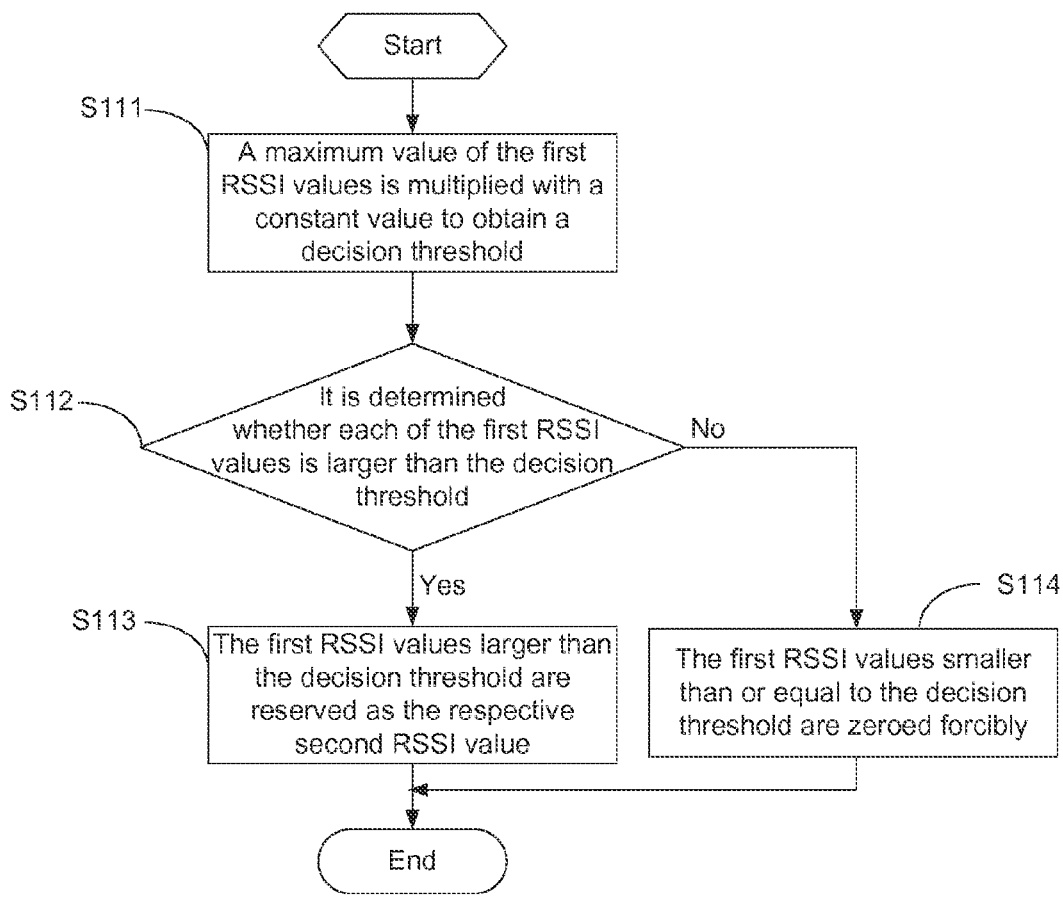
FIG. 2 shows a flow diagram of a step of making decisions on first RSSI values to obtain second RSSI values in the above embodiment.

Further, with reference to FIG. 2, S11 specifically includes that:

S111: a maximum value of the first RSSI values is multiplied with a constant value to obtain a decision threshold.

The constant value is set according to an actual situation, for example, it may be set as 1/14, 1/16 or 1/20. In the embodiment, the constant value is preferably 1/16.

S112: it is determined whether each of the first RSSI values is larger than the decision threshold, when the first RSSI value is larger than the decision threshold, S113 is turned; when the first RSSI value is smaller than or equal to the decision threshold, S114 is turned.

S113: the first RSSI values larger than the decision threshold are reserved as the respective second RSSI value.

S114: the first RSSI values smaller than or equal to the decision threshold are zeroed forcibly.

If the number of the second RSSI values after the RSSI decision is too many, although the frequency sweeping may be accurate, the frequency sweeping time may also be prolonged to fail to achieve the purpose of the disclosure. Therefore, a value may be selected according to an actual situation, so that an effect of accuracy can be achieved and the frequency sweeping time can also be reduced. In the embodiment, 16 largest second RSSI values are preferably reserved, of course, 18 or 20 largest second RSSI values may also be reserved, as long as the number of the reserved second RSSI values can make the frequency sweeping speed faster than that in the prior art, no limit is given in the disclosure.

S12: the second RSSI values are sorted, and frequency sweeping is performed according to a sorted result.

Figure 5:
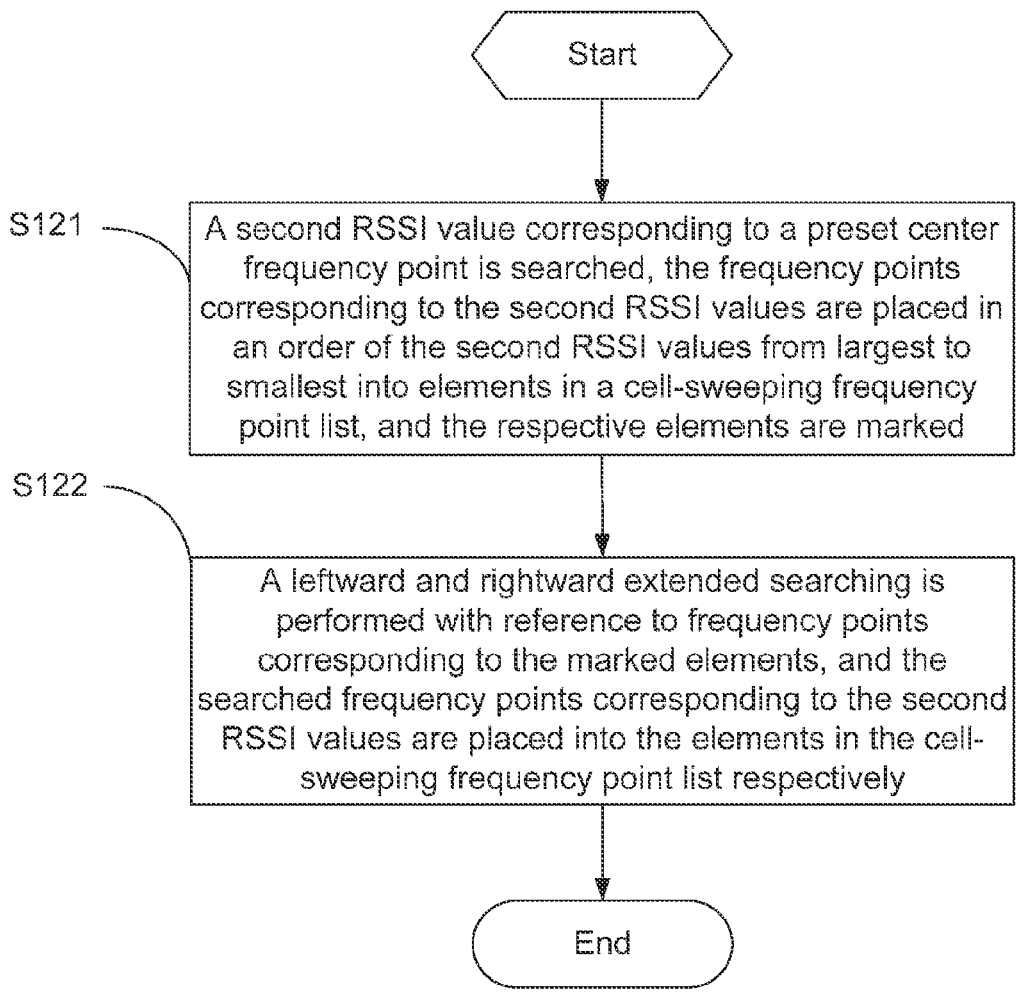
FIG. 5 shows a flow diagram of a step of sorting the second RSSI values and performing frequency sweeping according to a sorted result in the above embodiment.

Further, with reference to FIG. 5, S12 includes specifically as follows.

S121: a second RSSI value corresponding to a preset center frequency point is searched, the frequency points corresponding to the second RSSI values are placed in an order of the second RSSI values from largest to smallest into elements in a cell-sweeping frequency point list, and the respective elements are marked.

S122: a leftward and rightward extended searching is performed with reference to frequency points corresponding to the marked elements, and the searched frequency points corresponding to the second RSSI values are placed into the elements in the cell-sweeping frequency point list respectively.

S123: the frequency points corresponding to the second RSSI values are swept according to the cell-sweeping frequency point list.

The method for implementing fast frequency sweeping provided in the embodiment performs the RSSI measurements according to the preset first frequency sweeping step length, and then sorts the measured RSSI values, wherein the sorting method changes a traditional manner of sorting the measured RSSI values in an order of the measured RSSI values from largest to smallest in terms of the frequency points, such that an accurate cell-sweeping frequency point can be searched as soon as possible.

Figure 6:
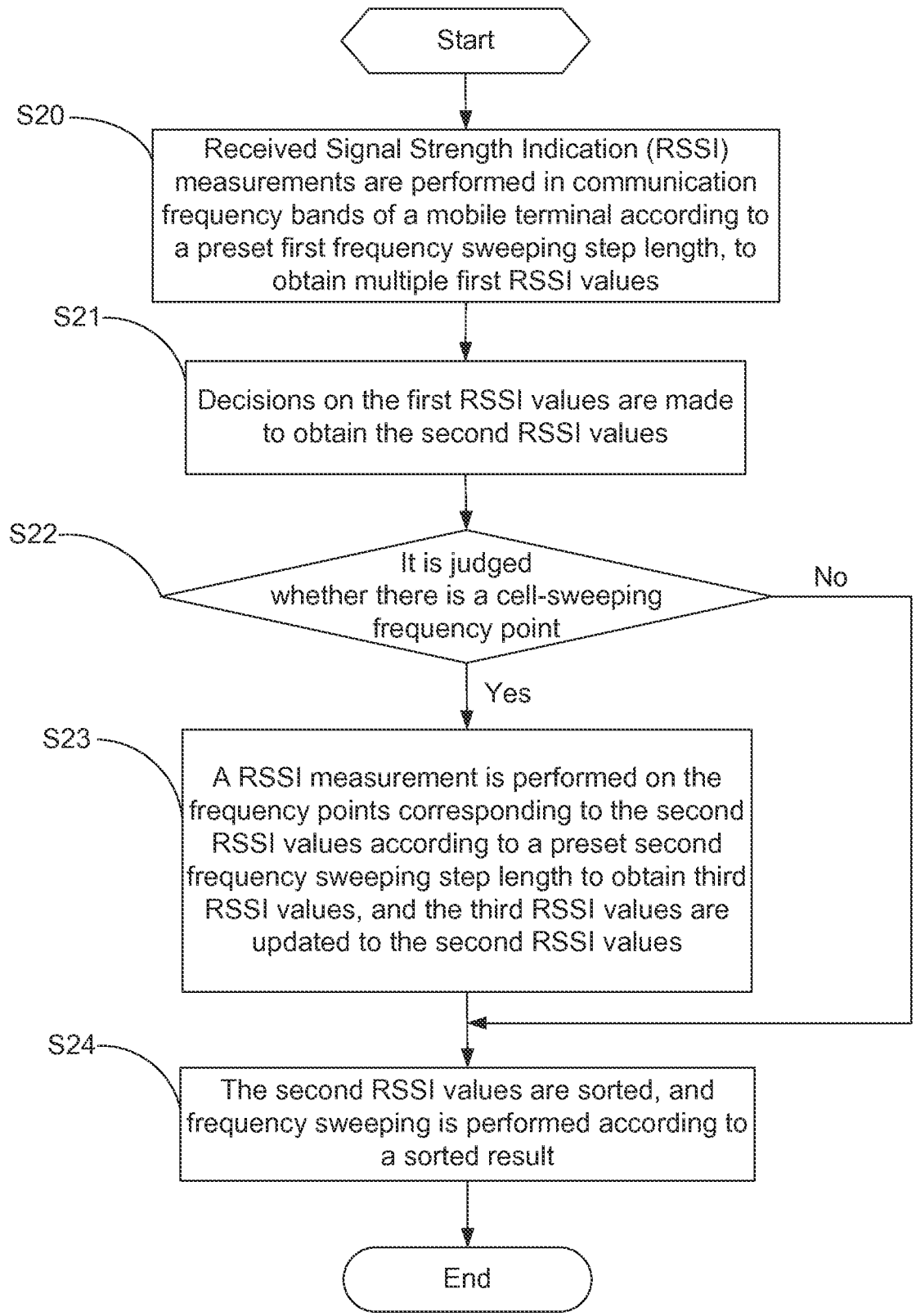
FIG. 6 shows a flow diagram of another embodiment of the method for implementing the fast frequency sweeping of the mobile terminal according to the disclosure.

FIG. 6 shows a flow of another embodiment of the method for implementing the fast frequency sweeping of the mobile terminal according to the disclosure, and the method for implementing the fast frequency sweeping of the mobile terminal in the embodiment includes the following steps.

S20: Received Signal Strength Indication (RSSI) measurements are performed in communication frequency bands of a mobile terminal according to a preset first frequency sweeping step length, to obtain multiple first RSSI values.

S21: decisions on the first RSSI values are made to obtain the second RSSI values.

S20 and S21 are respectively the same as S10 and S11 in the above embodiment, and will not be described again herein.

S22: it is judged whether there is a cell-sweeping frequency point between two adjacent frequency points corresponding to two adjacent second RSSI values respectively, when there is no cell-sweeping frequency point between the two adjacent frequency points corresponding to the two adjacent second RSSI values respectively, S24 is turned; when there is a cell-sweeping frequency point between the two adjacent frequency points corresponding to the two adjacent second RSSI values respectively, S23 is turned.

In the embodiment, for the judgment of the cell-sweeping frequency point, an upper limit value of the frequency sweeping is set in advance, when the number of times of performing the frequency sweepings in the frequency bands according to the preset first frequency sweeping step length is smaller than the preset upper limit value of the frequency sweeping, it is indicated that there is a cell-sweeping frequency point. For example, the frequency sweeping is performed in the wave band, which has a frequency band range of 8 MHz, according to the preset first frequency sweeping step length (800 kHz), it is needed to perform the frequency sweeping 10 times. While the preset upper limit value of the frequency sweeping is 16, which is larger than the times (10 times) of the current frequency sweeping, therefore, there are cell-sweeping frequency points.

S23: RSSI measurements are performed on the frequency points corresponding to the second RSSI values according to a preset second frequency sweeping step length to obtain third RSSI values, the third RSSI values are updated to the second RSSI values, and S24 is turned.

Figure 7:
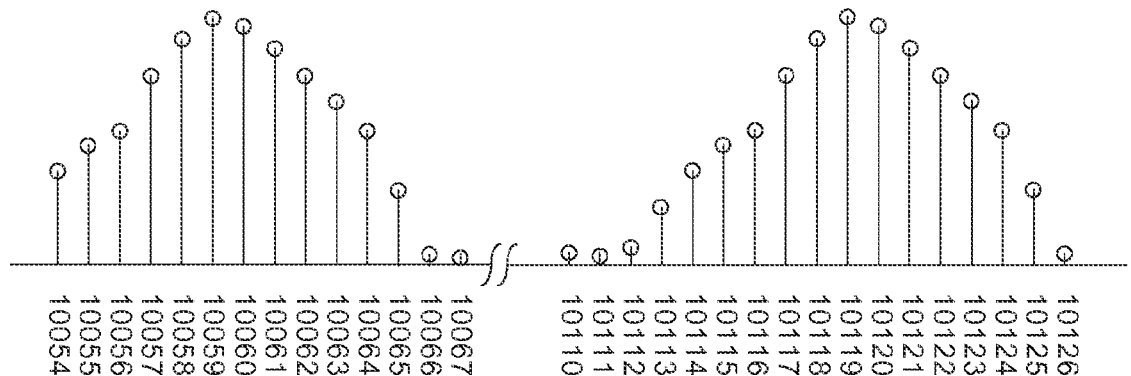
FIG. 7 shows the structure diagram of the frequency points shown in FIG. 4 after performing RSSI measurements according to a preset second frequency sweeping step length.

In S23, based on the second RSSI values, each of the second RSSI value is performed a leftward and rightward extended measurement to complementally measure three RSSI values according to the preset second frequency sweeping step length. During the complementary measurement, the additional RSSI value measurements on the frequency points are performed until a frequency point reaches the boundary of the wireless channel. when complementally measured RSSI values obtained through a respective leftward and rightward extension of two second RSSI values have an overlapped part, the measurement can be only performed one time. The second RSSI values obtained in the first embodiment are taken as example, the preset second frequency sweeping step length is preferably 200 kHz, and it can be seen from FIG. 3 and FIG. 4 that, when a RSSI complementary measurement is performed for the RSSI value with the UARFCN of 10054 according to the preset second frequency sweeping step length of 200 kHz, a frequency point on the left of the UARFCN10054 has exceeded the boundary of the wireless channels, no complementary measurement is needed, so three RSSI values are complementally measured at frequency points on the right of the UARFCN10054, that is, the RSSI values with UARFCNs of 10055, 10056 and 10057 are respectively measured; there are only three frequency points between the RSSI values with UARFCNs of 10058 and 10062, since an overlapping appears when the RSSI values with UARFCNs of 10058 and 10062 are performed a leftward and rightward extended measurement respectively to complementally measure three RSSI values, the measurement is needed to be performed one time. The third RSSI values, as shown in FIG. 7, are obtained through the RSSI value complementary measurement in S104. Finally, all third RSSI values are updated to the second RSSI values.

S24 is the same as S12 of the above embodiment, and a process of sorting the second RSSI values obtained through S23 will be described specifically hereinafter.

Further, S24 includes specifically as follows.

S241: a second RSSI value corresponding to a preset center frequency point is searched, the frequency points corresponding to the second RSSI values are placed in an order of the second RSSI values from largest to smallest into elements in a cell-sweeping frequency point list, and the respective elements are marked.

In S241: the cell-sweeping frequency point list includes a plurality of elements, i.e., storage spaces, used for storing the frequency points corresponding to the sorted RSSI values. As the center frequency point of each channel in a communication frequency band, a preset center frequency point may be set in advance by a user. As shown in FIG. 7, the preset center frequency points are 10059 of the first channel and 10119 of the second channel respectively, and the RSSI value of the preset center frequency point 10059 is larger than that of the preset center frequency point 10119, so the preset center frequency point 10059 is placed into the first element of the cell-sweeping frequency point list, the preset center frequency point 10119 is placed into the second element of the cell-sweeping frequency point list, and the elements are marked respectively. For example, the first element into which the preset center frequency point 10059 is placed is marked as N1, and the second element into which the preset center frequency point 10119 is placed is marked as N2. The frequency point list formed through S111 is shown as follows (NaN is an empty element in the form):

| 10059 | 10119 | NaN | NaN | NaN | NaN | ... | NaN |
|---|---|---|---|---|---|---|---|

Similarly, when there are a plurality of preset center frequency points, the second RSSI values corresponding to all preset center frequency points are sorted in an order of the second RSSI values from largest to smallest according to the above method, the frequency points corresponding to the sorted second RSSI values are placed into the elements in the cell-sweeping frequency point list respectively, and the elements are marked as N1, N2, N3, . . . .

S242: a leftward and rightward extended searching is performed with reference to frequency points corresponding to the marked elements, and the searched frequency points corresponding to the second RSSI values are placed into the elements in the cell-sweeping frequency point list respectively.

S242 may be divided into two following steps.

S2421: a leftward and rightward extended searching is performed with reference to the frequency points corresponding to the marked elements, the searched frequency points are obtained according to the following formula:

N1−n*A; wherein n is the number of times of a cyclic searching, and A is the preset second frequency sweeping step length. When a leftward extended searching is performed by taking the frequency point corresponding to other element marks except N1 as the reference point. N1 in the formula should be changed into the corresponding element mark.

S2422: a rightward extended searching is performed with reference to the frequency points corresponding to the marked elements, the searched frequency points are obtained according to the following formula:

N1+n*A; wherein n is the number of times of the cyclic searching, and A is the preset second frequency sweeping step length. When a rightward extended searching is performed by taking the frequency point corresponding to other element marks except N1 as the reference point. N1 in the formula should be changed into the corresponding element mark.

As shown in FIG. 7, when the first searching is performed, that is, n is 1, firstly, the frequency point 10058 can be obtained according to the formula N1−n*A, and the frequency point 10118 can be obtained according to the formula N2−n*A, then the frequency point 10058 and the frequency point 10118 are placed into the empty elements in the cell-sweeping frequency point list respectively, the formed frequency point list is as follows:

| 10059 | 10119 | 10058 | 10118 | NaN | NaN | ... | NaN |
|---|---|---|---|---|---|---|---| secondly, the frequency point 10060 can be obtained according to the formula N1+n*A, and the frequency point 10120 can be obtained according to the formula N2+n*A, then the frequency point 10060 and the frequency point 10120 are placed into the empty elements in the cell-sweeping frequency point list respectively, the formed frequency point list is as follows:

| 10059 | 10119 | 10058 | 10118 | 10060 | 10120 | ... | NaN |
|---|---|---|---|---|---|---|---|

It should be noted that, S2421 and S2422 have no specific order, that is, S2422 may further be performed first, and then S2421 is performed.

Similarly, when the second searching is performed, that is, n is 2, corresponding frequency points are obtained again through the searching according to S2421 and S2422, and the frequency points are placed into empty elements in the cell-sweeping frequency point list. Many times of the cyclic searching are performed until all frequency points are sorted and placed into the empty elements in the cell-sweeping frequency point list completely.

Although the method for implementing the fast frequency sweeping of the mobile terminal in the embodiment, which includes performing the first RSSI measurement according to the preset first frequency sweeping step length, and performing the second RSSI measurement for the results of the first measurement according to the preset second frequency sweeping step length, increases a frequency sweeping time, the frequency sweeping can be more accurate, and in general, the frequency sweeping time in the method is less than that in the prior art.

Figure 8:
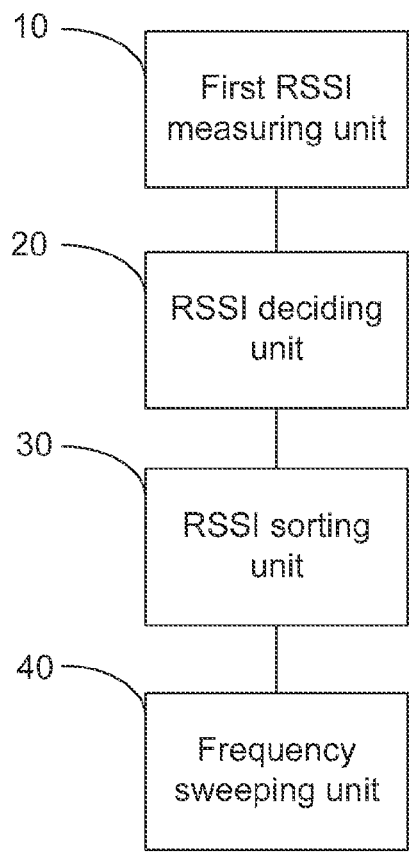
FIG. 8 shows a structure diagram of one embodiment of an apparatus for implementing fast frequency sweeping of a mobile terminal according to the disclosure.

FIG. 8 shows a structure of one embodiment of an apparatus for implementing fast frequency sweeping of a mobile terminal according to the disclosure. The apparatus for implementing the fast frequency sweeping of the mobile terminal in the disclosure includes:

a first RSSI measuring unit 10, configured to perform RSSI measurements in communication frequency bands of a mobile terminal according to a preset first frequency sweeping step length, to obtain multiple first RSSI values;

wherein the preset first frequency sweeping step length is set according to a communication frequency band of the mobile terminal; for example, TD-SCDMA is taken as example, as the channel bandwidth of the TD-SCDMA is 1.6 MHz, the preset first frequency sweeping step length may be set as ¼, ½ or the like of the channel bandwidth; the preset first frequency sweeping step length in the embodiment is preferably ½ of the channel bandwidth, i.e., 800 kHz; a specific process of performing the frequency sweeping according to the preset first frequency sweeping step length has been described in the above embodiments of the method and will not be described again herein;

a RSSI deciding unit 20, configured to make decisions on the first RSSI values to obtain second RSSI values;

a RSSI sorting unit 30, configured to sort the second RSSI values; and a frequency sweeping unit 40, configured to perform frequency sweeping according to a sorted result of the RSSI sorting unit 30.

Figure 9:
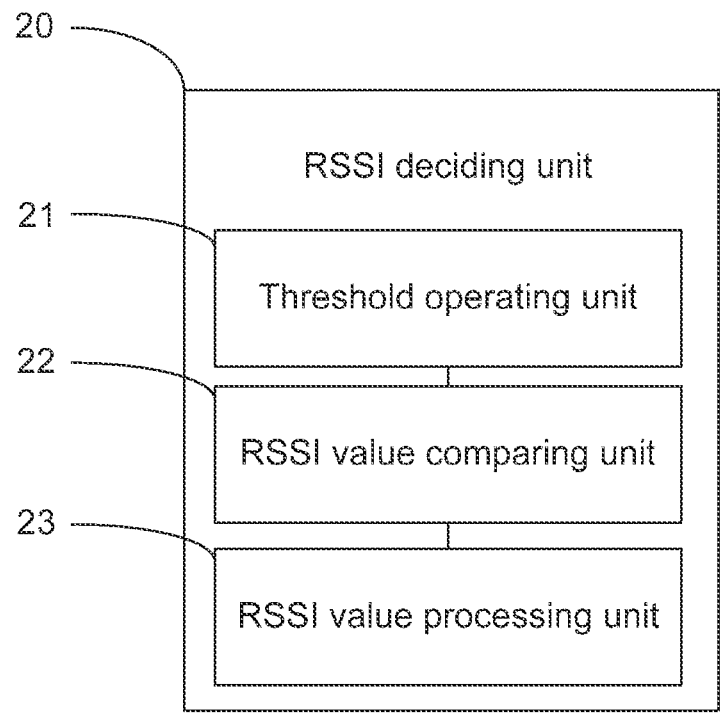
FIG. 9 shows a structure diagram of a RSSI deciding unit in the above embodiment.

With reference to FIG. 9, the RSSI deciding unit 20 includes:

a threshold operating unit 21, configured to multiply a maximum value of the first RSSI values with a constant value, to obtain a decision threshold;

a RSSI value comparing unit 22, configured to compare each of the first RSSI values with the decision threshold; and a RSSI value processing unit 23, configured to reserve the first RSSI values larger than the decision threshold as the respective second RSSI values; and to zero the first RSSI values smaller than or equal to the decision threshold forcibly.

The RSSI value processing unit 23 is further configured to judge whether the number of the second RSSI values exceeds a preset upper limit value of the frequency sweeping; the number of the second RSSI values is preferably 16 in the embodiment, that is, 16 largest second RSSI values are reserved when the number of the second RSSI values exceeds 16.

Figure 10:
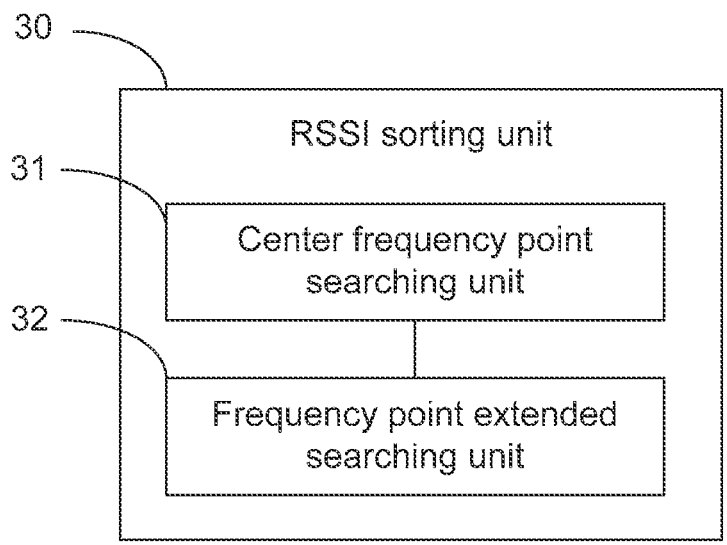
FIG. 10 shows a structure diagram of a RSSI sorting unit in the above embodiment.

With reference to FIG. 10, the RSSI sorting unit 30 includes:

a center frequency point searching unit 31, configured to search a second RSSI value corresponding to a preset center frequency point, to place frequency points corresponding to the second RSSI values in an order of the second RSSI values from largest to smallest into elements in a cell-sweeping frequency point list, and to mark the respective elements; and a frequency point extended searching unit 32, configured to perform a leftward and rightward extended searching with reference to frequency points corresponding to the marked elements, and to place the searched frequency points corresponding to the second RSSI values into the elements in the cell-sweeping frequency point list.

The apparatus for implementing the fast frequency sweeping of the mobile terminal in the embodiment performs the RSSI measurement according to the preset first frequency sweeping step length, and then sorts the measured RSSI values, wherein the sorting method changes a traditional manner of sorting the measured RSSI values in an order of the measured RSSI values from largest to smallest in terms of the frequency points, such that an accurate cell-sweeping frequency point can be searched as soon as possible.

Figure 11:
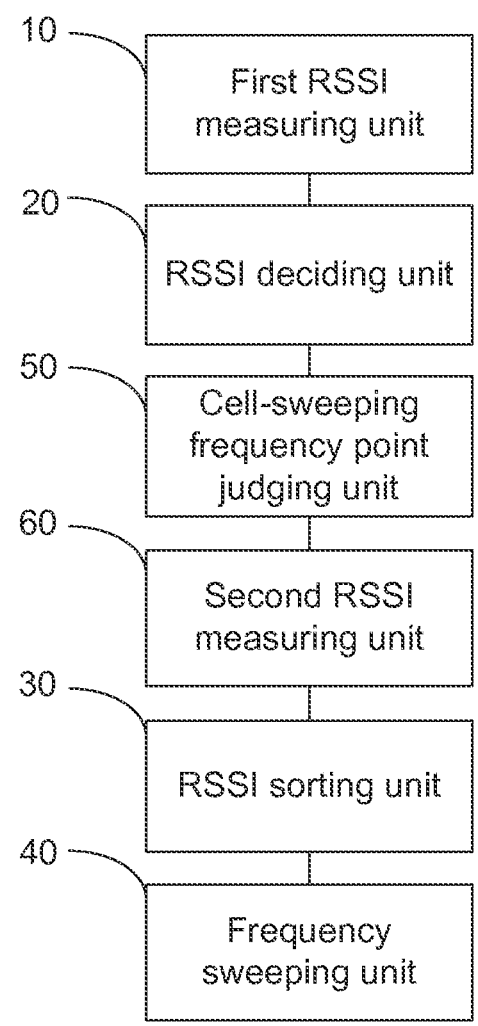
FIG. 11 shows a structure diagram of another embodiment of the apparatus for implementing the fast frequency sweeping of the mobile terminal according to the disclosure.

FIG. 11 shows a structure of another embodiment of the apparatus for implementing the last frequency sweeping of the mobile terminal according to the disclosure. A difference between the apparatus for implementing the fast frequency sweeping of the mobile terminal in the embodiment and that in the above embodiment is that, the apparatus in the embodiment further includes:

a cell-sweeping frequency point judging unit 50, configured to judge whether there is a cell-sweeping frequency point between two adjacent frequency points corresponding to two adjacent second RSSI values respectively; and a second RSSI measuring unit 60, configured to perform RSSI measurements on the frequency points corresponding to the second RSSI values according to a preset second frequency sweeping step length to obtain third RSSI values, and to update the third RSSI values to the second RSSI values, when there is a cell-sweeping frequency point between the two adjacent frequency points corresponding to the two adjacent second RSSI values respectively.

The RSSI sorting unit 30 is configured to sort the second RSSI values obtained by the second RSSI measuring unit 60. The sorting process has been described in the above embodiment of the method and will not be described again herein.

Although the method for implementing the fast frequency sweeping of the mobile terminal in the embodiment, which includes performing the first RSSI measurement according to the preset first frequency sweeping step length, and performing the second RSSI measurement for the results of the first measurement according to the preset second frequency sweeping step length, increases a frequency sweeping time, the frequency sweeping can be more accurate, and in general, the frequency sweeping time in the method is less than that in the prior art.

The above are just the preferred embodiments of the disclosure and are not intended to limit the scope of protection of the disclosure; either any made equivalent structure or equivalent flow transformation, or a direct or indirect application in other relevant technical fields should be included within the scope of protection of the disclosure according to the content of the description and the drawings of the disclosure.

The invention claimed is:

1. A method for implementing fast frequency sweeping of a mobile terminal, comprising:
    performing Received Signal Strength Indication (RSSI) measurements in communication frequency bands of a mobile terminal according to a preset first frequency sweeping step length, to obtain multiple first RSSI values;
    making decisions on the first RSSI values to obtain second RSSI values;
    sorting the second RSSI values; and
    performing frequency sweeping according to a sorted result,
    wherein the making decisions on the first RSSI values to obtain the second RSSI values comprises:
    multiplying a maximum value of the first RSSI values with a constant value, to obtain a decision threshold;
    comparing each of the first RSSI values with the decision threshold;
    reserving the first RSSI values larger than the decision threshold as the respective second RSSI values; and
    zeroing the first RSSI values smaller than or equal to the decision threshold forcibly.

2. The method for implementing the fast frequency sweeping of the mobile terminal according to claim 1, further comprising:

after making decisions on the first RSSI values to obtain the second RSSI values and before sorting the second RSSI values and performing the frequency sweeping according to the sorted result,
judging whether there is a cell-sweeping frequency point between two adjacent frequency points corresponding to two adjacent second RSSI values respectively.

3. The method for implementing the fast frequency sweeping of the mobile terminal according to claim 2, wherein when there is a cell-sweeping frequency point between the two adjacent frequency points corresponding to the two adjacent second RSSI values respectively, performing RSSI measurements on the frequency points corresponding to the second RSSI values according to a preset second frequency sweeping step length to obtain third RSSI values, and updating the third RSSI values to the second RSSI values.

4. The method for implementing the fast frequency sweeping of the mobile terminal according to claim 2, wherein the sorting the second RSSI values and performing the frequency sweeping according to the sorted result comprises:
   searching a second RSSI value corresponding to a preset center frequency point, placing the frequency points corresponding to the second RSSI values in an order of the second RSSI values from largest to smallest into elements in a cell-sweeping frequency point list, and marking the respective elements;
   performing a leftward and rightward extended searching with reference to frequency points corresponding to the marked elements, and placing the searched frequency points corresponding to the second RSSI values into the elements in the cell-sweeping frequency point list respectively; and
   sweeping the frequency points corresponding to the second RSSI values according to the cell-sweeping frequency point list.

5. The method for implementing the fast frequency sweeping of the mobile terminal according to claim 3, wherein the sorting the second RSSI values and performing the frequency sweeping according to the sorted result comprises:
   searching a second RSSI value corresponding to a preset center frequency point, placing the frequency points corresponding to the second RSSI values in an order of the second RSSI values from largest to smallest into elements in a cell-sweeping frequency point list, and marking the respective elements;
   performing a leftward and rightward extended searching with reference to frequency points corresponding to the marked elements, and placing the searched frequency points corresponding to the second RSSI values into the elements in the cell-sweeping frequency point list respectively; and
   sweeping the frequency points corresponding to the second RSSI values according to the cell-sweeping frequency point list.

6. The method for implementing the fast frequency sweeping of the mobile terminal according to claim 1, wherein the sorting the second RSSI values and performing the frequency sweeping according to the sorted result comprises:
   searching a second RSSI value corresponding to a preset center frequency point, placing the frequency points corresponding to the second RSSI values in an order of the second RSSI values from largest to smallest into elements in a cell-sweeping frequency point list, and marking the respective elements;
   performing a leftward and rightward extended searching with reference to frequency points corresponding to the marked elements, and placing the searched frequency points corresponding to the second RSSI values into the elements in the cell-sweeping frequency point list respectively; and
   sweeping the frequency points corresponding to the second RSSI values according to the cell-sweeping frequency point list.

7. An apparatus for implementing fast frequency sweeping of a mobile terminal, comprising:
   a first RSSI measuring unit, configured to performing RSSI measurements in communication frequency bands of a mobile terminal according to a preset first frequency sweeping step length, to obtain multiple first RSSI values;
   a RSSI deciding unit, configured to make decisions on the first RSSI values to obtain second RSSI values;
   a RSSI sorting unit, configured to sort the second RSSI values; and
   a frequency sweeping unit, configured to perform frequency sweeping according to a sorted result,
   wherein the RSSI decision unit comprises:
   a threshold calculating unit, configured to multiply a maximum value of the first RSSI values with a constant value, to obtain a decision threshold;
   a RSSI value comparing unit, configured to compare each of the first RSSI values with the decision threshold; and
   a RSSI value processing unit, configured to reserve the first RSSI values larger than the decision threshold as the respective second RSSI values, and to zero the first RSSI values smaller than or equal to the decision threshold forcibly.

8. The apparatus for implementing the fast frequency sweeping of the mobile terminal according to claim 7, further comprising:
   a cell-sweeping frequency point judging unit, configured to judge whether there is a cell-sweeping frequency point between two adjacent frequency points corresponding to two adjacent second RSSI values respectively; and
   a second RSSI measuring unit, configured to perform RSSI measurements on the frequency points corresponding to the second RSSI values according to a preset second frequency sweeping step length to obtain third RSSI values, and to update the third RSSI values to the second RSSI values, when there is a cell-sweeping frequency point between the two adjacent frequency points corresponding to the two adjacent second RSSI values respectively.

9. The apparatus for implementing the fast frequency sweeping of the mobile terminal according to claim 8, wherein the RSSI sorting unit comprises;
   a center frequency point searching unit, configured to search a second RSSI value corresponding to a preset center frequency point, to place frequency points corresponding to the second RSSI values in an order of the second RSSI values from largest to smallest into elements in a cell-sweeping frequency point list, and to mark the respective elements; and
   a frequency point extended searching unit, configured to perform a leftward and rightward extended searching with reference to frequency points corresponding to the marked elements, and to place the searched frequency points corresponding to the second RSSI values into the elements in the cell-sweeping frequency point list.

10. A mobile terminal, comprising the apparatus for implementing the fast frequency sweeping of the mobile terminal according to claim 9.

11. The apparatus for implementing the fast frequency sweeping of the mobile terminal according to claim 7, wherein the RSSI sorting unit comprises;
- a center frequency point searching unit, configured to search a second RSSI value corresponding to a preset center frequency point, to place frequency points corresponding to the second RSSI values in an order of the second RSSI values from largest to smallest into elements in a cell-sweeping frequency point list, and to mark the respective elements; and
- a frequency point extended searching unit, configured to perform a leftward and rightward extended searching with reference to frequency points corresponding to the marked elements, and to place the searched frequency points corresponding to the second RSSI values into the elements in the cell-sweeping frequency point list.

12. A mobile terminal, comprising the apparatus for implementing the fast frequency sweeping of the mobile terminal according to claim 11.

* * * * *